（12）United States Patent
Wetterwald et al.

(10) Patent No.: US 9,838,352 B2
(45) Date of Patent: Dec. 5, 2017

(54) ENDPOINT DEVICE IDENTIFICATION BASED ON DETERMINED NETWORK BEHAVIOR

(71) Applicant: Cisco Technology, Inc., San Jose, CA (US)

(72) Inventors: Patrick Wetterwald, Mouans Sartoux (FR); Eric Michel Levy-Abegnoli, Valbonne (FR); Pascal Thubert, La Colle sur Loup (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 272 days.

(21) Appl. No.: 14/716,927

(22) Filed: May 20, 2015

(65) Prior Publication Data

US 2016/0344693 A1 Nov. 24, 2016

(51) Int. Cl.
*H04L 29/12* (2006.01)
(52) U.S. Cl.
CPC ........ *H04L 61/103* (2013.01); *H04L 61/6022* (2013.01)
(58) Field of Classification Search
CPC .......................... H04L 61/103; H04L 61/6022
See application file for complete search history.

(56) References Cited

U.S. PATENT DOCUMENTS

| | | | |
|---|---|---|---|
| 2007/0255818 A1* | 11/2007 | Tanzer ................. | G06F 21/552 709/224 |
| 2010/0100618 A1 | 4/2010 | Kuhlke et al. | |
| 2010/0192069 A1 | 7/2010 | Toebes et al. | |
| 2010/0309813 A1 | 12/2010 | Singh et al. | |
| 2014/0376519 A1* | 12/2014 | Yang ................. | H04W 74/0816 370/336 |

OTHER PUBLICATIONS

Shaptai et al., "Andromaly': a behavioral malware detection framework for andriod devices", [online], Jan. 6, 2011, [retrieved on Apr. 2, 2015]. Retrieved from the Internet: <URL: http://www.researchgate.net/publication/220616039_Andromaly_a_behavioral_malware_detection_framework_for_android_devices>, 30 pages.

"Configuring IDS Signatures", Cisco Wireless LAN Controller Configuration Guide, Release 7.4, [online], [retrieved on Apr. 1, 2015]. Retrieved from the Internet: <URL: http://www.cisco.com/c/en/us/td/docs/wireless/controller/7-4/configuration/guides/consolidated/b_cg74_CONSOLIDATED/b_cg74_CONSOLIDATED_chapter_01000001.pdf>, pp. 1-10.

Narten, et al., "Neighbor Discovery for IP version 6 (IPv6)", Network Working Group, Request for Comments: 4861, Sep. 2007, pp. 1-97.

(Continued)

*Primary Examiner* — Jianye Wu
(74) *Attorney, Agent, or Firm* — Leon R. Turkevich

(57) ABSTRACT

In one embodiment, a method comprises detecting, by a network device, an endpoint device attempting to access a data network via a data link; and generating, by the network device, a unique device signature for identifying the endpoint device based on the network device identifying a sequence of link layer data packets transmitted by the endpoint device upon connection to the data link, the unique device signature identifying a behavior of the endpoint device independent of any link layer address used by the endpoint device.

22 Claims, 5 Drawing Sheets

(56) References Cited

OTHER PUBLICATIONS

Thomson et al., "IPv6 Stateless Address Autogonfiguration", Network Working Group, Request for Comments: 4862, Sep. 2007, pp. 1-30.
Calhoun et al., "Lightweight Access Point Protocol", Independent Submission, Request for Comments: 5412, Feb. 2010, pp. 1-125.
Wikipedia, "MAC address", [online], Apr. 1, 2015, [retrieved on Apr. 1, 2015]. Retrieved from the Internet: <URL: http://en.wikipedia.org/w/index.php?title=MAC_address&printable=yes>, pp. 1-7.
O'Grady, "iOS 8 randomizes MAC addresses", [online], Jun. 11, 2014, [retrieved on Apr. 1, 2015]. Retrieved from the internet: <URL: http://www.zdnet.com/article/ios-8-randomizes-mac-addresses/>, pp. 1-11.

* cited by examiner

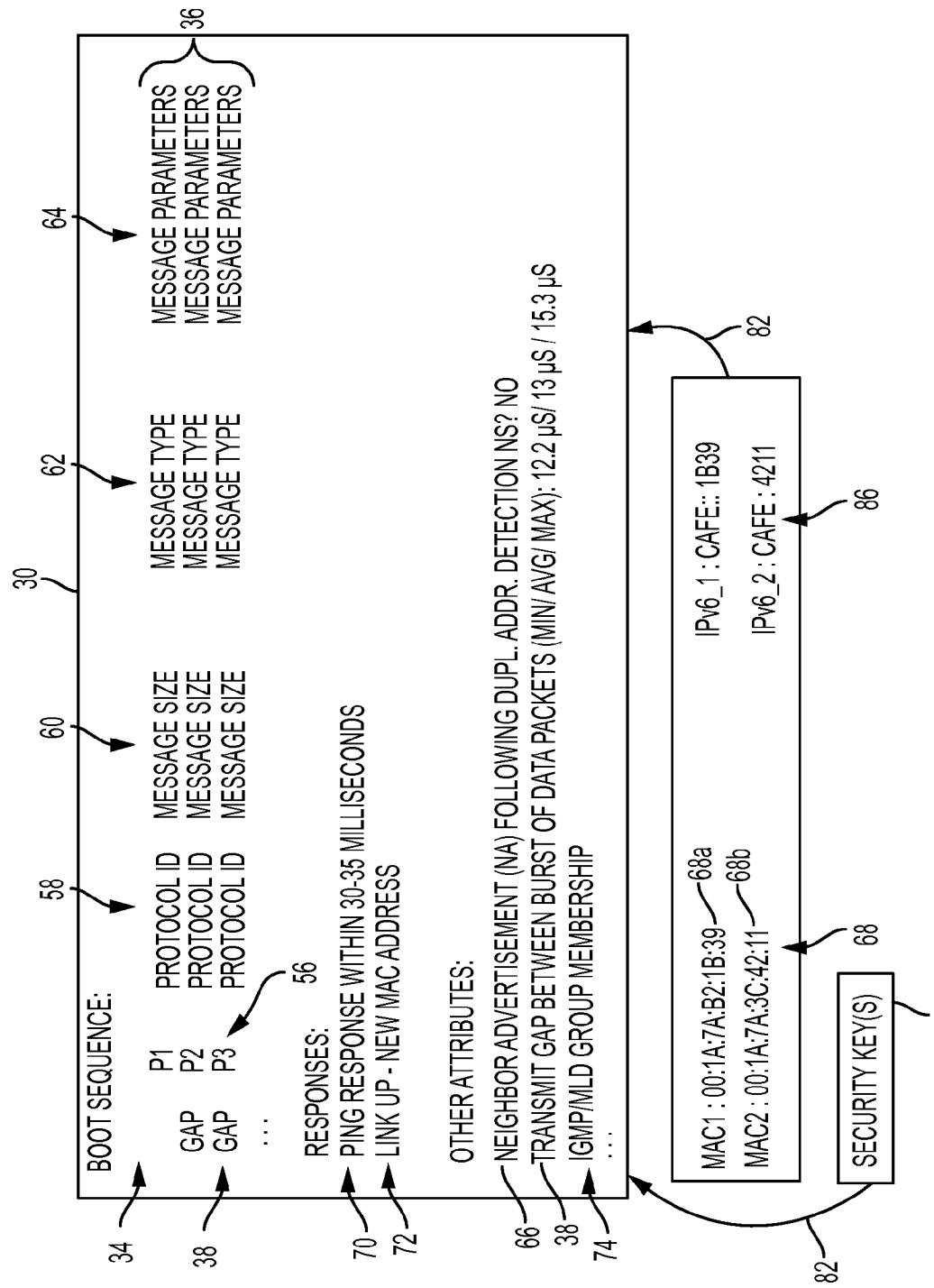

ENDPOINT DEVICE IDENTIFICATION BASED ON DETERMINED NETWORK BEHAVIOR

TECHNICAL FIELD

The present disclosure generally relates to identifying an endpoint device based on a determined network behavior of the network device.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Network devices use one or more addresses for identification in a data network, including for example a media access control (MAC) layer address for identification of the network device at the link layer, and an Internet Protocol (IP) address for identification at the IP network layer. Network devices include network switching devices, network controller devices, and network endpoint devices. Network switching devices (e.g., link layer switches, IP layer routers, etc.) and/or network controller devices (e.g., wireless controller devices) can store addresses of network endpoint devices as an index for storing reachability information, security and/or authentication, information, etc. Wired or wireless access devices (e.g., a Wi-Fi wireless network access point) can be implemented as stand-alone devices or part of a network switching device and/or network controller device.

Network endpoint devices are being developed (e.g., IOS8 devices from Apple, Inc.) to change their MAC layer address if the network endpoint devices roam from one Wi-Fi wireless network access point to another Wi-Fi wireless network access point.

BRIEF DESCRIPTION OF THE DRAWINGS

Reference is made to the attached drawings, wherein elements having the same reference numeral designations represent like elements throughout and wherein:

FIG. 5 illustrates an example device signature specifying behavioral identifiers that identify the network behavior of an identified network device, according to an example embodiment.

DESCRIPTION OF EXAMPLE EMBODIMENTS

OVERVIEW

In one embodiment, a method comprises detecting, by a network device, an endpoint device attempting to access a data network via a data link; and generating, by the network device, a unique device signature for identifying the endpoint device based on the network device identifying a sequence of link layer data packets transmitted by the endpoint device upon connection to the data link, the unique device signature identifying a behavior of the endpoint device independent of any link layer address used by the endpoint device.

In another embodiment, an apparatus comprises a device interface circuit and a processor circuit. The device interface circuit is configured for detecting an endpoint device attempting to access a data network via a data link. The processor circuit is configured for generating a unique device signature for identifying the endpoint device based on the processor circuit identifying a sequence of link layer data packets transmitted by the endpoint device upon connection to the data link. The unique device signature identifies a behavior of the endpoint device independent of any link layer address used by the endpoint device.

In another embodiment, one or more non-transitory tangible media are encoded with logic for execution by a machine and when executed by the machine operable for: detecting, by the machine implemented as a network device, an endpoint device attempting to access a data network via a data link; and generating, by the network device, a unique device signature for identifying the endpoint device based on the network device identifying a sequence of link layer data packets transmitted by the endpoint device upon connection to the data link, the unique device signature identifying a behavior of the endpoint device independent of any link layer address used by the endpoint device.

DETAILED DESCRIPTION

Particular embodiments enable classification and identification of an endpoint device (e.g., a sensor device, a client endpoint device, etc.) based on an identified behavior of the endpoint device, independent of any link layer address used by the endpoint device. Hence, an endpoint device can be identified within a network, even if the endpoint device changes its link layer address (e.g., MAC address, EUI-48 address, IEEE 802 address, etc.). Network-based policies established for an endpoint device (e.g., security relationships) also can be maintained even if an endpoint device changes its link layer address, based on associating the policies with a unique device signature that identifies the endpoint device based on its corresponding behavior. Hence, network devices can maintain policy relationships with endpoint devices independent of any link layer address used by the endpoint device.

Figure 1:
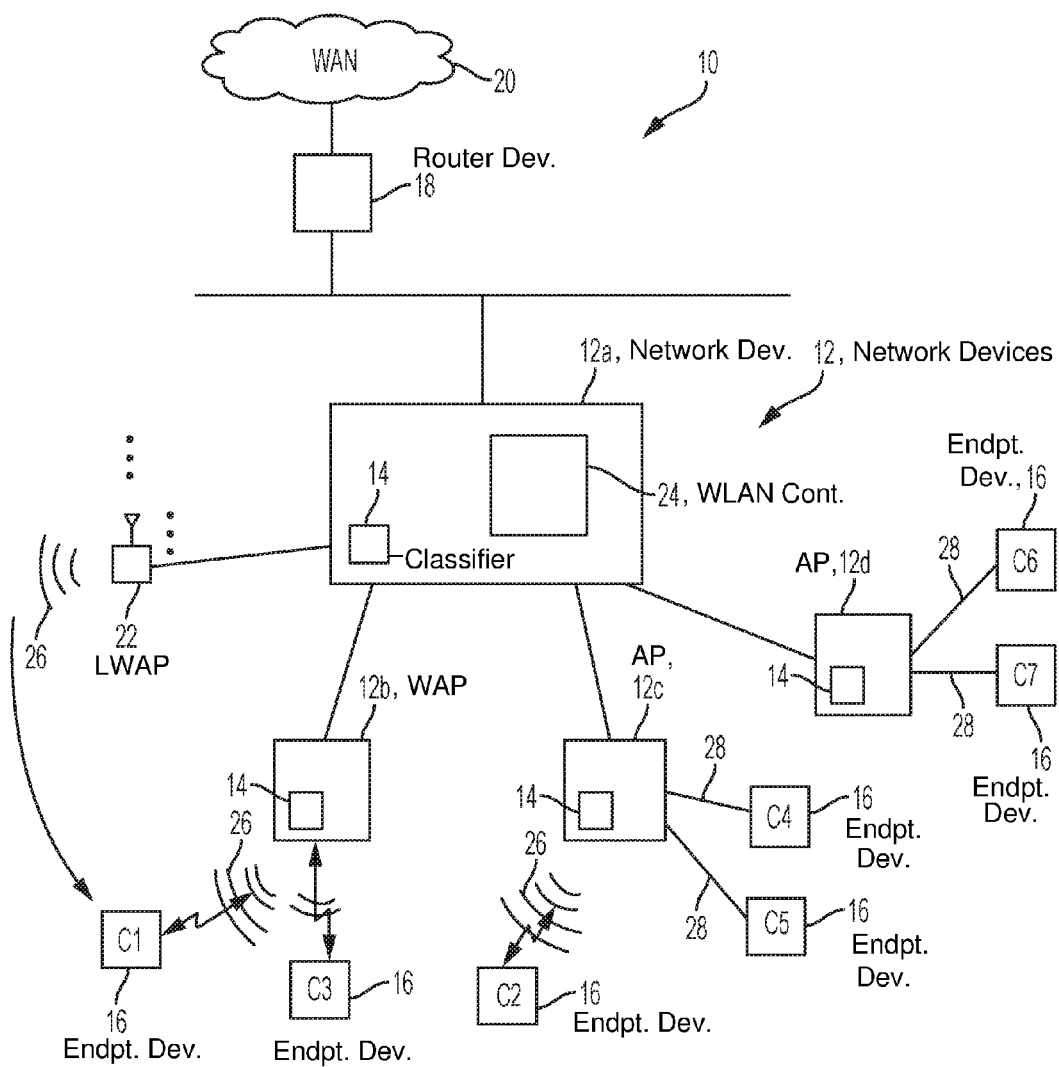
FIG. 1 illustrates an example system having an apparatus for identifying an endpoint device based on determining a network behavior of the endpoint device independent of any link layer address used by the endpoint device, according to an example embodiment.

FIG. 1 is a diagram illustrating an example data network 10 having network devices 12 (e.g., 12a, 12b, 12c, 12d) comprising network device classifiers 14 configured for identifying endpoint devices 16 based on the determined behaviors of the respective endpoint devices 16, according to an example embodiment. The network 10 also can include a router device 18 configured for providing reachability to a wide area network (WAN) 20. The data network 10 also can include one or more wireless "lightweight" access points (LWAP) 22 providing wireless communications under the control of a wireless local area network (WLAN) controller 24, for example according to Lightweight Access Point Protocol (LWAPP) according to RFC 5412.

Each apparatus 12, 16, 18, 20 and 22 is a physical machine (i.e., a hardware device) configured for implementing network communications with other physical machines via the network 10. The term "configured for" or "configured to" as used herein with respect to a specified operation refers to a device and/or machine that is physically constructed and arranged to perform the specified operation. Hence, each apparatus 12, 16, 18, 20, and 22 is a network-enabled (user machine providing user access to a network)/machine implementing network communications via the network 10.

The network devices 12 executing the network device classifier 14 can provide wired or wireless connections to the endpoint devices 16. For example, the network device 12a can be implemented as a network switch or router that can execute a wireless local area network controller 24 for distributed control of one or more lightweight access points 22 providing a wireless data link 26. The network device 12b can be implemented as a wireless access point (WAP) providing one or more wireless data links 26 with no wired data links 28, and the network device 12c can be implemented as an access point (AP) providing a wireless data link 26 and/or a wired data link 28. The network device 12d can be implemented as a wired access point such as a network access switch, a network router, a network hub, or a network repeater providing one or more wired data links 28 for one or more endpoint devices 16. Other network devices 12 can be used to execute the network device classifier 14 and/or the wireless local area network controller 24 as described herein, for example a firewall device, etc.

Existing network devices have previously implemented and enforced network policies (e.g., traffic shaping, admission control, firewall policies, security policies, etc.) based on an assumption that an endpoint device 16 would use a fixed (i.e., unchangeable) link layer address, for example a media access control (MAC) address that is "burned in" by the manufacturer of the device interface circuit utilizing the MAC address. However, client endpoint devices (e.g., a smart phone illustrated as "C1" 16) are now being configured to change their link layer address if the client endpoint devices roam from one Wi-Fi wireless network access point (e.g., lightweight access point 22) to another Wi-Fi wireless network access point (e.g., 12b).

According to an example embodiment, the network device classifier 14 executed in a network device 12 can identify an endpoint device 16 based on identifying a behavior of the endpoint device 16, independent of any link layer address used by the endpoint device 16. The network device classifier 14 can identify the behavior of the endpoint device 16 based on monitoring each and every data packet transmitted by the endpoint device 16, identifying a sequence of link layer data packets transmitted by the endpoint device 16 upon connection to a data link such as a wireless data link 26 or a wired data link 28, and generating a unique device signature (30 of FIG. 5) that identifies each detectable attribute of the sequence of link layer data packets.

Figure 4:
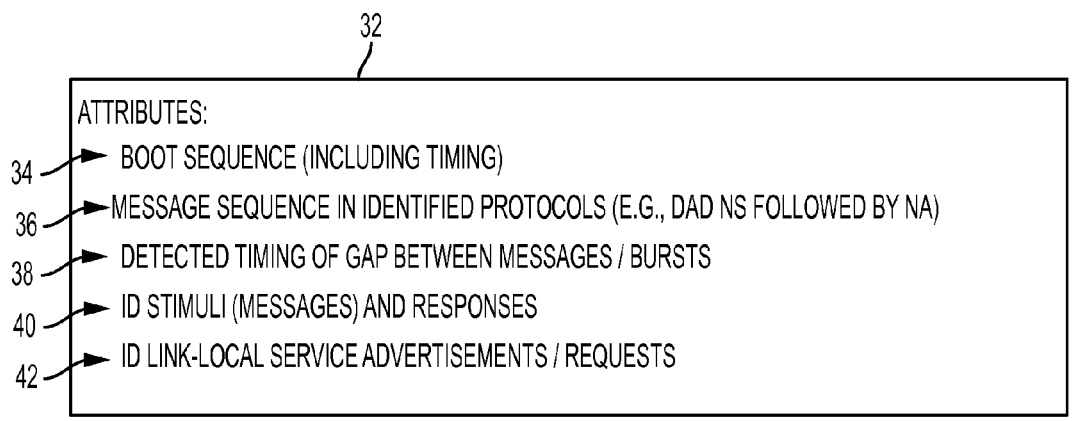
FIG. 4 illustrates example behavioral identifiers that can be detected to determine the network behavior of a network device.

As described in further detail below with respect to FIG. 4, example attributes 32 detectable by the network device classifier 14 can include a determined "boot sequence" 34 of data packets transmitted by the endpoint device 16 during "boot up" (i.e. initialization) of the endpoint device 16 (e.g., following reset or power-up); a determined message sequence 36 within identified protocols (e.g., IPv6 neighbor discovery), timing information 38 describing gaps between data packets or messages transmitted by the endpoint device 16, for example gap intervals between burst messages; an identification 40 of one or more prescribed stimuli (e.g., messages) generated by the network device classifier 14 and respective responses by the endpoint device 16; and an identification 42 of link-local service advertisements and/or link local service requests by the endpoint device 16. Hence, any and all attributes of the link layer data packets transmitted by the endpoint device 16 can be used by the network device classifier 14 to determine the corresponding device behavior of the endpoint device 16.

Hence, the attributes 32 of the link layer data packets transmitted by the endpoint device 16 can be detected and stored by the network device classifier 14 into the corresponding unique device signature 30 identifying the endpoint device 16, starting with initial data packets transmitted by the endpoint device 16 during establishment of a connection with the corresponding network device 12. The network device classifier 14 can execute learning machine-based classification techniques, heuristic analysis, etc., in order to uniquely identify the endpoint device 16 based on its corresponding unique device signature 30. The network device classifier 14 also can update the unique device signature 30 as more data packets are transmitted by the endpoint device 16, enabling the unique device signature 30 to account for changes in device behavior over time.

The network device classifier 14 also can compare a unique device signature 30 with a previously-generated device signature 30 to determine if there is a substantial similarity between the two device signatures 30, indicating an endpoint device 16 has changed its link layer address. For example, a network device (e.g., 12a) can forward to another network device (e.g., 12b) an existing unique device signature 30, for example based on the network device classifier 14 in the network device 12a having generated the unique device signature 30 while the endpoint device "C1" 16 was communicating via the lightweight access point 22. The network device classifier 14 executed in the network device 12b, in response to receiving the previously-generated device signature 30 from the network device 12a, can determine that the endpoint device 16 has changed its link layer address based on a determined substantial similarity between the two device signatures 30, and in response merge the two device signatures together into an updated unique device signature 30, with the link layer addresses of the two device signatures associated with the updated unique device signature 30. The network device classifier 14 executed in the network device 12b can forward the updated unique device signature 30 to the network device 12a (implemented, for example, as a switching device in a prescribed switching domain), enabling the wireless local area network controller 24 executed in the network device 12a to forward the updated unique device signature 30 to other network devices 12 for identification of the endpoint device "C1" 16 as it changes its link layer address while roaming through the data network 10.

Hence, the endpoint devices 16 can be identified based on their respective behaviors as identified in their respective unique device signatures 30, independent of any link layer addresses used by the endpoint devices 16.

Figure 2:
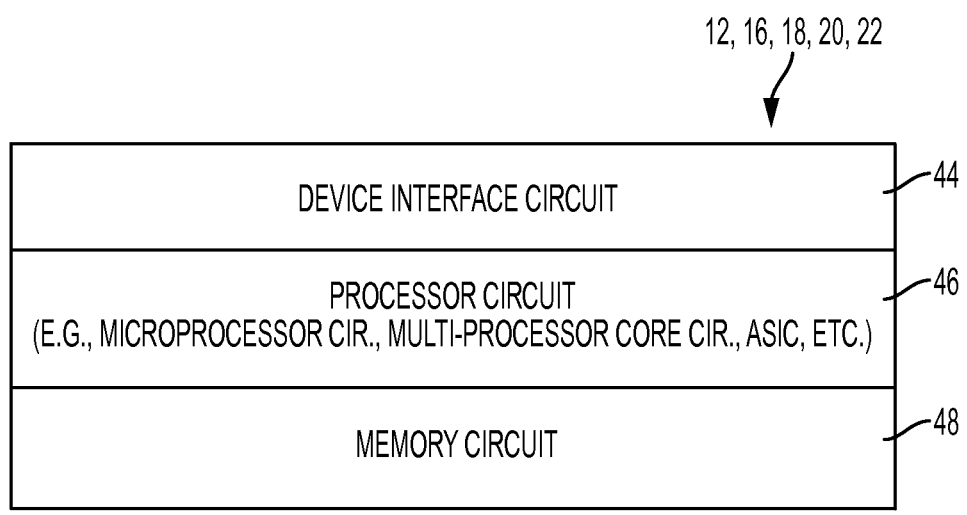
FIG. 2 illustrates an example implementation of any of the devices of FIG. 1.

FIG. 2 illustrates an example implementation of any one of the devices 12, 16, 18, 20, and/or 22 of FIG. 1, according to an example embodiment.

Each apparatus 12, 16, 18, 20, and/or 22 can include a device interface circuit 44, a processor circuit 46, and a memory circuit 48. The device interface circuit 44 can include one or more distinct physical layer transceivers for communication with any one of the other devices 12, 16, 18, 20, and/or 22; the device interface circuit 44 also can include an IEEE based Ethernet transceiver for communications with the devices of FIG. 1 via any of the links (e.g., a wired or wireless link, an optical link, etc.). The processor circuit 46 can be configured for executing any of the operations described herein, including execution of the network device classifier 14 and/or the wireless local area network controller 24. The memory circuit 48 can be configured for storing any data (e.g., any unique device signature 30) or data packets as described herein.

Any of the disclosed circuits of the devices 12, 16, 18, 20, and/or 22 (including the device interface circuit 44, the processor circuit 46, the memory circuit 48, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 48) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 48 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 48 can be implemented dynamically by the processor circuit 46, for example based on memory address assignment and partitioning executed by the processor circuit 46.

Figure 3A:
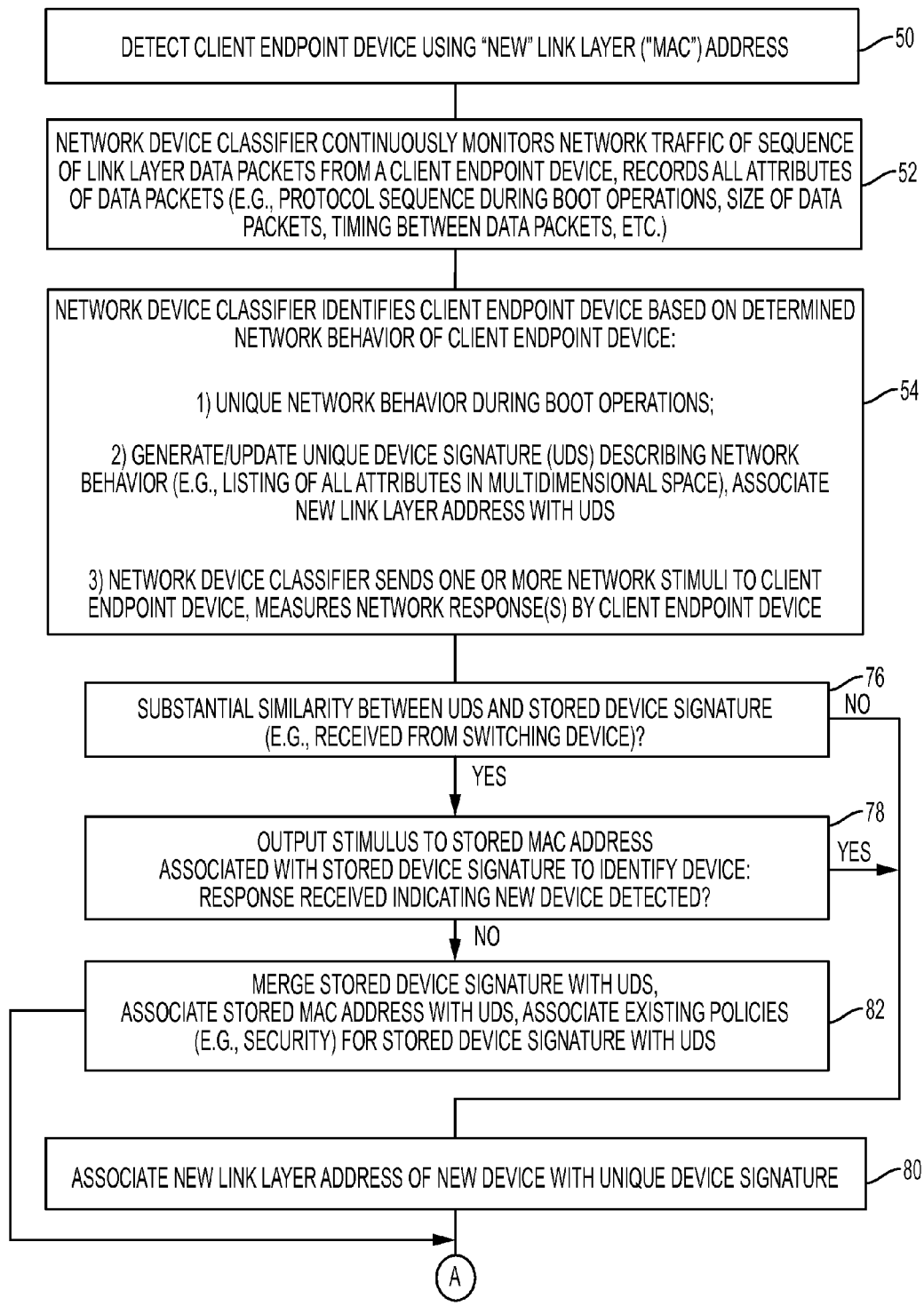
FIGS. 3A and 3B illustrate an example method for an apparatus identifying an endpoint device based on determining a network behavior of the endpoint device, according to an example embodiment.
Figure 3B:
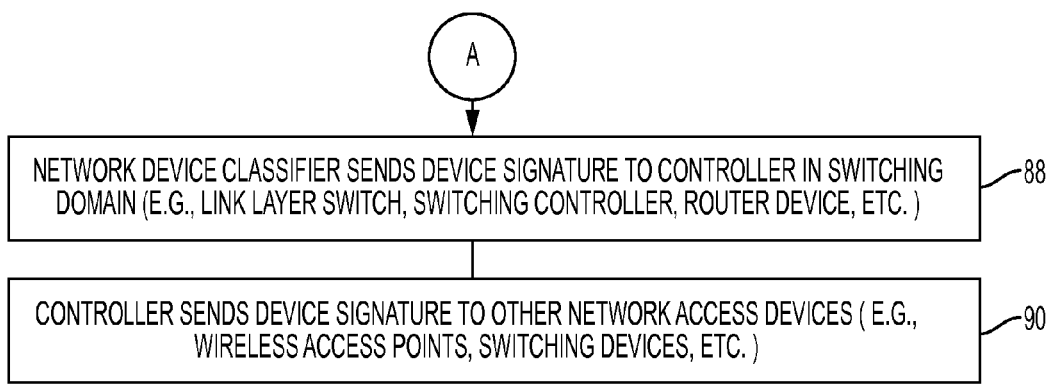

FIGS. 3A and 3B illustrate an example method for an apparatus identifying an endpoint device based on determining a network behavior of the endpoint device, according to an example embodiment. The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIGS. 2 and 3A, the device interface circuit 44 in a network device 12 is configured for detecting an endpoint device 16 attempting to access the data network 10 via a wireless data link 26 or a wired data link 28, for example based on detecting data packets transmitted by the endpoint device 16. The device interface circuit 44 can forward the data packets to a processor circuit 46 executing the network device classifier 14, enabling the processor circuit 46 to detect in operation 50 an endpoint device 16 using a "new" link layer address (e.g., a MAC address), based on parsing a data packet received by the corresponding device interface circuit 44 (as illustrated in FIG. 1, the network device classifier 14 executed in the network device 12*a* can receive the data packet via the lightweight access point 22).

The processor circuit 46 executing the network device classifier 14 is configured for continuously monitoring in operation 52 for the network traffic comprising a sequence of link layer data packets from the endpoint device 16. The processor circuit 46 executing the network device classifier 14 also is configured for recording all attributes 32 of the data packets, including for example protocol sequence or boot sequence 34, size of data packets (60 of FIG. 5), message sequence 36, timing information 38, etc. In particular, each endpoint device 16 develops its own unique behavior based on its specific implementation of existing protocols, and based on its particular implementation (e.g., as a sensor device, a wireless printer, a network-enabled mass storage device, or a client endpoint device such as a smart phone, a smart tablet, a laptop, a desktop computer, etc.).

As illustrated in FIG. 3A and FIG. 5, the network device classifier 14 executed by the processor circuit 46 in operation 54 can identify the behavior of the endpoint device 16 based on identifying the sequence of link layer data packets transmitted by the endpoint device 16 upon connection to the wireless data link 26 or the wired data link 28, and storing the associated attributes 32 in the unique device signature 30. For example the network device classifier 14 can identify the attributes of the boot sequence 34, including identifying each data packet 56 in the boot sequence 34 by protocol type 58, message size 60, message type 62, message parameter values 64, etc. Example attributes 32 include determining whether the endpoint device 16 is a first type of device that outputs a neighbor advertisement (NA) message following a duplicate address detection (DAD) based neighbor solicitation (NS) message according to RFC 4861 or RFC 4862, or whether the endpoint device 16 is a second type of device that does not output the NA message following DAD operations: in particular, RFC 4862 specifies IPv6 stateless address autoconfiguration that requires an IPv6 device execute DAD based on outputting a neighbor solicitation message; some endpoint devices 16, however, may optionally be configured to output a neighbor advertisement message following the NS message. Hence, the network device classifier 14 can specify in the unique device signature 30 an NA-after-DAD-NS indicator 66 indicating whether the endpoint device 16 outputs the NA message following the DAD-based NS message.

The network device classifier 14 can detect other attributes 30, for example events that cause the endpoint device 16 to initiate a change in the link layer address or network layer address, for example prior to shut-down or prior to entering sleep-mode, following startup or reset, change in date (e.g., frequency of changes being hourly, daily, weekly, following software update, etc.).

Additional detectable attributes 30 by the network device classifier 14 can include: detecting multicast memberships, for example detecting Internet Group Management Protocol (IGMP) requests or responses identifying an IPv4 multicast group, or Multicast Listener Discovery (MLD) messages identifying an IPv6 multicast group, or multicast Domain Name System (mDNS) messages, etc.; detecting an identification 42 of link-local service advertisements and/or link local service requests such as Universal Plug and Play (UPnP) messages, Simple Service Discovery Protocol (SSDP) messages, Bonjour protocol messages, etc.

Additional detectable attributes 30 by the network device classifier 14 can include network layer (IP layer) requests such as Address Resolution Protocol (ARP) messages, Bootstrap Protocol (BootP) requests, or higher layer requests (e.g., UDP Open Port) or responses (e.g., UDP Ping Response messages) that are executed by the endpoint device 16.

The network device classifier 14 also can identify timing information associated with the data packets, for example the identified "gap" 38 (e.g., InterPacket Gap Interval, Interframe Spacing Interval, etc.).

Hence, the network device classifier 14 in operation 54 can generate the unique device signature 30 based on the identified attributes 32 of the sequence of link layer data packets output by the endpoint device 16. The attributes 32 can be identified in the unique device signature 30 in various forms, for example metadata parameters, statistical values and variations, etc., which can provide an identification of the behavior in a multidimensional space. The network device classifier 14 in operation 54 also can associate the currently-used link layer address 68 (e.g., 68*a*) with the unique device signature 30. The network device classifier 14 also can send one or more network stimuli to the endpoint device 16, and measure the network response(s) by the endpoint device 16. Example responses that can be detected by the network device classifier 14 (based on respective stimuli generated by the network device classifier 14) can include IP or UDP Ping responses 70, ARP messages (e.g., Reverse ARP reply), IGMP or MLD reports with group memberships 74, SSDP Alive messages, Service Names in response to service queries, etc. The network device classifier 14 also can temporarily disable and restart the data link 26 or 28 to determine the corresponding response 72 by the endpoint device 16 upon the restarting of the data link 26 or 28 (e.g., whether a new MAC address is attempted (described below), whether a NA message is transmitted, whether a NS message is transmitted, etc.).

Hence, the network device classifier 14 can detect the network-based behavior of the endpoint device 16. As apparent from the foregoing, the "behavior" of the endpoint device 16 is based on the particular configuration and implementation of the endpoint device 16 and not user operations during execution of a user application by a client endpoint device (e.g., a smart phone, smart tablet, wired or wireless computer, etc.). Hence, a user-based request (e.g., a Hypertext Transport Protocol (HTTP) request) is not a "behavior" of the endpoint device 16 because the user-based request is necessarily based on user actions (e.g., a user entering an HTTP Request into a browser window), and not based on the particular configuration and implementation of the endpoint device 16; in other words, a user-based request is not a "behavior" of the endpoint device 16 because the same user-based request (or pattern of user-based requests based on the user actions) can be executed on different client endpoint devices.

The network device classifier 14 executed by the processor circuit 46 in operation 76 can determine whether the endpoint device 16 has accessed the data network 10 using a second different link layer address based on comparing the unique device signature 30 and a second unique device signature 30, for example received from the network device 12*a*. The second unique device signature 30 can be received based on a request-response protocol between the network device classifier 14 and the wireless local area network controller 24 executed in the network device 12*a*, or based on a synchronization between the network device classifiers 14; other techniques can be implemented for exchanging the unique device signatures 30 between the network devices 12.

The network device classifier 14 in operation 76 can compare the unique device signature 30 and the second unique device signature 30 in determining whether there is a substantial similarity between the unique device signature 30 and the second unique device signature 30, indicating substantially the same behavior by an endpoint device 16 using the link layer address 68*a* and the second different link layer address. The term "substantial similarity" refers to a sufficiently-high correlation between the first unique device signature 30 generated in operation 54 for the new endpoint device 16 and the second unique device signature 30 generated based on an endpoint device 16 having used the second different link layer address, where the "substantial similarity" is based on the two unique device signatures 30 having the minimum distance between values within the multidimensional space (relative to other unique device signatures 30 of other endpoint devices 16 in the data network 10); other techniques for determining "substantial similarity" can be based on multi-objective optimization, cluster analysis, learning machine optimization, etc. Hence, the network device classifier 14 can identify the unique device signature 30 as belonging to a new endpoint device 16 if there is no substantial similarity between the unique device signature 30 and any other stored unique device signature 30.

In response to the network device classifier 14 determining in operation 76 a substantial similarity between the unique device signature 30 and the second unique device signature 30, the network device classifier 14 in operation 78 can output a stimulus (e.g., an IP or UDP ping message, or a query message) to the second different link layer address stored with the second unique device signature 30, to determine the endpoint device identity, namely whether the first unique device signature 30 is for the same endpoint device 16 that used the second different link layer address during generation of the second unique device signature: for example, the network device classifier 14 in operation 78 can output, to the second different link layer address, a "first" query whether the endpoint device 16 is now using the new link layer address 68a (conversely, the network device classifier 14 in operation 78 can output, to the new link layer address 68a, a "second" query whether the endpoint device 16 previously used the second different link layer address); security-based challenges also can be included in the query to authenticate any response to the query.

The network device classifier 14 in operation 78 can determine whether the endpoint device 16 using the new link layer address is the same device that used the second different link layer address or a new device using the new link layer address, depending on the type of received response, if any. For example, the network device classifier 14 can determine the unique device signature 30 in operation 78 as belonging to a new device using the new link layer address 68a based on: the network device classifier 14 determining that the response to the above-described "first" query is "no" (i.e., the endpoint device 16 at the second different link layer address indicates it is not using the new link layer address 68a); the network device classifier 14 determining that the response to the above-described "second" query is "no" (i.e., the endpoint device 16 at the new link layer address 68a indicates it has not previously used the second different link layer address); or the network device classifier 14 determining that a network device responded to an endpoint device responded to an IP or UDP ping message directed at the second different link layer address (assuming all endpoint devices 16 in the data network 10 are configured to use only one link layer address at time).

The network device classifier 14 can determine in operation 78 that the endpoint device 16 is the same device having used the new link layer address 68a and the second different link layer address based on: the network device classifier 14 determining that the response to the above-described "first" query is "yes" (i.e., the endpoint device 16 at the second different link layer address indicates it is using the new link layer address 68a); the network device classifier 14 determining that the response to the above-described "second" query is "yes" (i.e., the endpoint device 16 at the new link layer address 68a indicates it has previously used the second different link layer address); or the network device classifier 14 determining an absence of any response to the stimulus (i.e., no response is received from the second different link layer address within a prescribed time interval, assuming all endpoint devices 16 in the data network 10 are configured to use only one link layer address at a time. Hence, the stimulus/response test in operation 78 can further distinguish between distinct endpoint devices 16 expressing similar behaviors.

In response to the network device classifier 14 detecting the unique device signature 30 as belonging to a new endpoint device 16 in operations 76 or 78, the network device classifier 14 in operation 80 can associate the new link layer address 68a of the new endpoint device 16 with the newly-generated unique device signature (and optionally tag the association as a new endpoint device in the unique device signature. In response to the network device classifier 14 detecting in operation 78 that the endpoint device 16 is the same device having used the new link layer address 68a and the second different link layer address, the network device classifier 14 in operation 82 can merge the second unique device signature 30 with the first unique device signature 30, and associate the (stored) second different link layer address (68b of FIG. 5) with the unique device signature 30. The network device classifier 14 in operation 82 also can associate, to the unique device signature 30, existing policies (e.g., security keys 84 of FIG. 5) that were previously associated with the second unique device signature 30. Hence, any prior link layer addresses (e.g., 68b), network layer addresses (86 of FIG. 5), and/or policies 84 previously assigned to the endpoint device 16 while using the second different link layer address 68b can be inherited by the same endpoint device 16 using the new link layer address 68a as detected in operation 50. Hence, an endpoint device 16 can maintain its existing policies 84 even if it changes its link layer address (e.g., from 68b to 68a).

Referring to FIG. 3B, the new unique device signature 30 (generated in operation 80) or the updated unique device signature 30 (based on the merging in operation 82) can be forwarded by the network device classifier 14 in operation 88 to another network device 12, for example the network device 12a implemented as a switching device having a prescribed switching domain. As described previously, the forwarding of the unique device signature 30 to the network device 12a enables the wireless local area network controller 24 executed in the network device 12a to send in operation 90 the unique device signature 30 to the other network devices 12.

According to example embodiments, endpoint devices are identified by their identified behavior in the data network, independent of any link layer address. Hence, network-based policies established for the endpoint devices can be maintained despite changes in the link layer address, based on tracking the endpoint devices based on their identified behavior.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   detecting, by a network device, an endpoint device attempting to access a data network via a data link; and
   generating, by the network device, a unique device signature for identifying the endpoint device based on the network device identifying a sequence of link layer data packets transmitted by the endpoint device upon connection to the data link, the unique device signature identifying a behavior of the endpoint device, including a boot sequence for the endpoint device, independent of any link layer address used by the endpoint device.

2. The method of claim 1, further comprising:
   determining the endpoint device is using a first link layer address in the sequence of link layer data packets, and in response associating the first link layer address with the unique device signature; and
   determining whether the endpoint device has accessed the data network using a second link layer address, distinct from the first link layer address, based on comparing the unique device signature with a second unique device signature of a network device having used the second link layer address.

3. The method of claim 2, further comprising:
    determining the endpoint device has accessed the data network using the second link layer address based on a determined substantial similarity between the unique device signature and the second unique device signature;
    merging the second unique device signature with the unique device signature based on the determined substantial similarity; and
    associating the second link layer address with the unique device signature, indicating the endpoint device has used the first link layer address and the second link layer address.

4. The method of claim 3, further comprising associating with the unique device signature, based on the determined substantial similarity, a security relationship having been granted for the second unique device signature during use of the second link layer address.

5. The method of claim 2, wherein the determining whether the endpoint device has accessed the data network using the second link layer address is based on:
    outputting a stimulus for the second link layer address; and
    determining an absence of any response to the stimulus, the determined absence indicating the second link layer address is not in use by a network device distinct from the endpoint device.

6. The method of claim 1, further comprising receiving the second unique device signature from a switching device having a prescribed switching domain, the switching device having obtained the second unique device signature from a second network device in the prescribed switching domain.

7. The method of claim 1, wherein the generating includes:
    generating the unique device signature based on the sequence of link layer data packets indicating the boot sequence for the endpoint device, including identification of a timing of each of the link layer data packets in the sequence;
    generating one or more stimuli to determine one or more responses by the endpoint device; and
    updating the unique device signature based on the responses by the endpoint device.

8. The method of claim 1, further comprising forwarding the unique device signature to a switching device having a prescribed switching domain, enabling the switching device to forward the unique device signature to other network devices for identification of the endpoint device.

9. The method of claim 1, wherein the generating includes determining the behavior from the link layer data packets based on at least one of:
    first distinguishing whether the endpoint device is of a first type that outputs a neighbor advertisement message following a duplicate address detection-based neighbor solicitation message, or a second type that does not output the neighbor advertisement message following the duplicate address detection-based neighbor solicitation message;
    second distinguishing the endpoint device based on a determined response to a prescribed stimulus sent to the endpoint device;
    third distinguishing the endpoint device based on link-local service-based advertisements or link-local service-based requests output by the endpoint device.

10. An apparatus comprising:
    a device interface circuit configured for detecting an endpoint device attempting to access a data network via a data link; and
    a processor circuit configured for generating a unique device signature for identifying the endpoint device based on the processor circuit identifying a sequence of link layer data packets transmitted by the endpoint device upon connection to the data link, the unique device signature identifying a behavior of the endpoint device, including a boot sequence for the endpoint device, independent of any link layer address used by the endpoint device.

11. The apparatus of claim 10, wherein the processor circuit further is configured for:
    determining the endpoint device is using a first link layer address in the sequence of link layer data packets, and in response associating the first link layer address with the unique device signature; and
    determining whether the endpoint device has accessed the data network using a second link layer address, distinct from the first link layer address, based on comparing the unique device signature with a second unique device signature of a network device having used the second link layer address.

12. The apparatus of claim 11, wherein the processor circuit further is configured for:
    determining the endpoint device has accessed the data network using the second link layer address based on a determined substantial similarity between the unique device signature and the second unique device signature;
    merging the second unique device signature with the unique device signature based on the determined substantial similarity; and
    associating the second link layer address with the unique device signature, indicating the endpoint device has used the first link layer address and the second link layer address.

13. The apparatus of claim 11, wherein the processor circuit further is configured for determining whether the endpoint device has accessed the data network using the second link layer address based on:
    causing the device interface circuit to output a stimulus for the second link layer address; and
    determining an absence of any response to the stimulus, the determined absence indicating the second link layer address is not in use by a network device distinct from the endpoint device.

14. The apparatus of claim 10, wherein the processor circuit further is configured for receiving the second unique device signature from a switching device having a prescribed switching domain, the switching device having obtained the second unique device signature from a second network device in the prescribed switching domain.

15. The apparatus of claim 10, wherein the processor circuit further is configured for:
    generating the unique device signature based on the sequence of link layer data packets indicating the boot sequence for the endpoint device, including identification of a timing of each of the link layer data packets in the sequence;
    generating one or more stimuli to determine one or more responses by the endpoint device; and
    updating the unique device signature based on the responses by the endpoint device.

16. The apparatus of claim 10, wherein the processor circuit further is configured for forwarding the unique device signature to a switching device having a prescribed switching domain, enabling the switching device to forward the unique device signature to other network devices for identification of the endpoint device.

17. The apparatus of claim 10, wherein the processor circuit further is configured for determining the behavior from the link layer data packets based on at least one of:
   first distinguishing whether the endpoint device is of a first type that outputs a neighbor advertisement message following a duplicate address detection-based neighbor solicitation message, or a second type that does not output the neighbor advertisement message following the duplicate address detection-based neighbor solicitation message;
   second distinguishing the endpoint device based on a determined response to a prescribed stimulus sent to the endpoint device;
   third distinguishing the endpoint device based on link-local service-based advertisements or link-local service-based requests output by the endpoint device.

18. One or more non-transitory tangible media encoded with logic for execution by a machine and when executed by the machine operable for:
   detecting, by the machine implemented as a network device, an endpoint device attempting to access a data network via a data link; and
   generating, by the network device, a unique device signature for identifying the endpoint device based on the network device identifying a sequence of link layer data packets transmitted by the endpoint device upon connection to the data link, the unique device signature identifying a behavior of the endpoint device, including a boot sequence for the endpoint device, independent of any link layer address used by the endpoint device.

19. The one or more non-transitory tangible media of claim 18, further operable for:
   determining the endpoint device is using a first link layer address in the sequence of link layer data packets, and in response associating the first link layer address with the unique device signature; and
   determining whether the endpoint device has accessed the data network using a second link layer address, distinct from the first link layer address, based on comparing the unique device signature with a second unique device signature of a network device having used the second link layer address.

20. The one or more non-transitory tangible media of claim 18, wherein the generating includes:
   generating the unique device signature based on the sequence of link layer data packets indicating the boot sequence for the endpoint device, including identification of a timing of each of the link layer data packets in the sequence;
   generating one or more stimuli to determine one or more responses by the endpoint device; and
   updating the unique device signature based on the responses by the endpoint device.

21. The one or more non-transitory tangible media of claim 18, further operable for:
   determining the endpoint device is using a first link layer address in the sequence of link layer data packets, and in response associating the first link layer address with the unique device signature;
   determining whether the endpoint device has accessed the data network using a second link layer address, distinct from the first link layer address, based on comparing the unique device signature with a second unique device signature of a network device having used the second link layer address;
   determining the endpoint device has accessed the data network using the second link layer address based on a determined substantial similarity between the unique device signature and the second unique device signature;
   merging the second unique device signature with the unique device signature based on the determined substantial similarity; and
   associating the second link layer address with the unique device signature, indicating the endpoint device has used the first link layer address and the second link layer address.

22. The one or more non-transitory tangible media of claim 18, wherein the generating includes determining the behavior from the link layer data packets based on at least one of:
   first distinguishing whether the endpoint device is of a first type that outputs a neighbor advertisement message following a duplicate address detection-based neighbor solicitation message, or a second type that does not output the neighbor advertisement message following the duplicate address detection-based neighbor solicitation message;
   second distinguishing the endpoint device based on a determined response to a prescribed stimulus sent to the endpoint device;
   third distinguishing the endpoint device based on link-local service-based advertisements or link-local service-based requests output by the endpoint device.

* * * * *